United States Patent
Irie et al.

(10) Patent No.: US 10,369,647 B2
(45) Date of Patent: Aug. 6, 2019

(54) WIRE ELECTRICAL DISCHARGE MACHINE AND WIRE ELECTRICAL DISCHARGE MACHINING METHOD

(71) Applicant: FANUC CORPORATION, Yamanashi (JP)

(72) Inventors: Shouta Irie, Yamanashi-ken (JP); Kaoru Hiraga, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 159 days.

(21) Appl. No.: 15/475,273

(22) Filed: Mar. 31, 2017

(65) Prior Publication Data
US 2017/0282268 A1 Oct. 5, 2017

(30) Foreign Application Priority Data
Apr. 1, 2016 (JP) ................. 2016-074430

(51) Int. Cl.
| | |
|---|---|
| *B23H 7/00* | (2006.01) |
| *B23H 11/00* | (2006.01) |
| *B23H 7/02* | (2006.01) |
| *B23H 7/20* | (2006.01) |
| *B25J 9/16* | (2006.01) |

(52) U.S. Cl.
CPC ............ *B23H 11/00* (2013.01); *B23H 7/02* (2013.01); *B23H 7/20* (2013.01); *B25J 9/1697* (2013.01); *G05B 2219/45043* (2013.01)

(58) Field of Classification Search
CPC . B23H 11/00; B23H 1/00; B23H 7/02; B23H 7/14; B23H 7/18; B23H 7/20; B23H 7/26; B25J 9/1694; B25J 9/1697
USPC ............... 219/69.11, 69.12, 69.14, 16.14
See application file for complete search history.

(56) References Cited

U.S. PATENT DOCUMENTS

| | | | |
|---|---|---|---|
| 5,183,986 A | 2/1993 | Magara et al. | |
| 5,796,618 A * | 8/1998 | Maeda | G05B 19/4097 |
| | | | 700/104 |

(Continued)

FOREIGN PATENT DOCUMENTS

| | | |
|---|---|---|
| CN | 1309594 A | 8/2001 |
| CN | 104339045 A | 2/2015 |

(Continued)

OTHER PUBLICATIONS

English Abstract for Japanese Publication No. 2014-014907 A, published Jan. 30, 2014, 2 pgs.

(Continued)

*Primary Examiner* — Dana Ross
*Assistant Examiner* — Ayub A Maye
(74) *Attorney, Agent, or Firm* — Fredrikson & Byron, P.A.

(57) ABSTRACT

A wire electrical discharge machine and a wire electrical discharge machining method are provided. The wire electrical discharge machine is equipped with a core position recognizing unit configured to recognize the position of a core which is fixed by a core fixing function, a core removal unit configured to remove the core, which is in the recognized position, from a workpiece on which machining has been performed, and a core removal determining unit configured to determine whether or not the core in the recognized position has actually been removed.

12 Claims, 15 Drawing Sheets

(56) References Cited

U.S. PATENT DOCUMENTS

| | | | |
|---|---|---|---|
| 2001/0043735 A1* | 11/2001 | Smargiassi | G06T 7/0008 |
| | | | 382/149 |
| 2008/0240511 A1 | 10/2008 | Ban et al. | |
| 2008/0285840 A1* | 11/2008 | Kawai | G01N 21/8851 |
| | | | 382/141 |
| 2012/0193326 A1 | 8/2012 | Mitsuyasu | |
| 2014/0014625 A1 | 1/2014 | Yamaoka et al. | |
| 2015/0001182 A1* | 1/2015 | Kurihara | B23H 9/00 |
| | | | 219/69.12 |
| 2015/0352647 A1 | 12/2015 | Abe et al. | |

FOREIGN PATENT DOCUMENTS

| | | |
|---|---|---|
| CN | 105312689 A | 2/2016 |
| JP | 618224 A | 1/1986 |
| JP | 63196326 A | 8/1988 |
| JP | 9216129 A | 8/1997 |
| JP | 2004268220 A | 9/2004 |
| JP | 2010155301 A | 7/2010 |
| JP | 2012166332 A | 9/2012 |
| JP | 2013144335 A | 7/2013 |
| JP | 201414907 A | 1/2014 |
| JP | 201424132 A | 2/2014 |
| JP | 2015229207 A | 12/2015 |
| WO | 2015132987 A1 | 9/2015 |

OTHER PUBLICATIONS

English Abstract for Japanese Publication No. 2012-166332 A, published Sep. 6, 2012, 2 pgs.
English Abstract and Machine Translation for International Publication No. WO 2015-132987 A1, published Sep. 11, 2015, 16 pgs.
Untranslated Decision to Grant a Patent mailed by Japan Patent Office (JPO) for Application No. JP 2016-074430, dated Apr. 19, 2018, 3 pgs.
English machine translation of Decision to Grant a Patent mailed by Japan Patent Office (JPO) for Application No. JP 2016-074430, dated Apr. 19, 2018, 3 pgs.
Untranslated Notification of Reasons for Refusal mailed by Japan Patent Office (JPO) for Application No. JP 2016-074430, dated Mar. 8, 2018, 4 pgs.
English machine translation of Notification of Reasons for Refusal mailed by Japan Patent Office (JPO) for Application No. JP 2016-074430, dated Mar. 8, 2018, 4 pgs.
English Abstract for Japanese Publication No. 2015-229207 A, published Dec. 21, 2015, 2 pgs.
English Abstract and Machine Translation for Japanese Publication No. 2014-024132 A, published Feb. 6, 2014, 30 pgs.
English Abstract and Machine Translation for Japanese Publication No. 2013-144335 A, published Jul. 25, 2013, 8 pgs.
English Abstract and Machine Translation for Japanese Publication No. 2010-155301 A, published Jul. 15, 2010, 12 pgs.
English Abstract and Machine Translation for Japanese Publication No. 63-196326 A, published Aug. 15, 1988, 5 pgs.
English Abstract and Machine Translation for Japanese Publication No. 61-008224 A, published Jan. 14, 1986, 4 pgs.
Extended European Search Report dated Aug. 9, 2017 for related European Application No. 17000528.4, 7 pgs.
English Abstract and Machine Translation for Japanese Publication No. 2005-268220 A, published Sep. 30, 2004, 9 pgs.
English Abstract and Machine Translation for Japanese Publication No. 09-216129 A, published Aug. 19, 1997, 11 pgs.
English Abstract and Machine Translation for Chinese Publication No. 104339045 A, published Feb. 11, 2015, 34 pgs.
English Abstract and Machine Translation for Chinese Publication No. 105312689 A, published Feb. 10, 2016, 23 pgs.
English Abstract and Machine Translation for Chinese Publication No. 1309594 A, published Aug. 22, 2001, 18 pgs.

\* cited by examiner

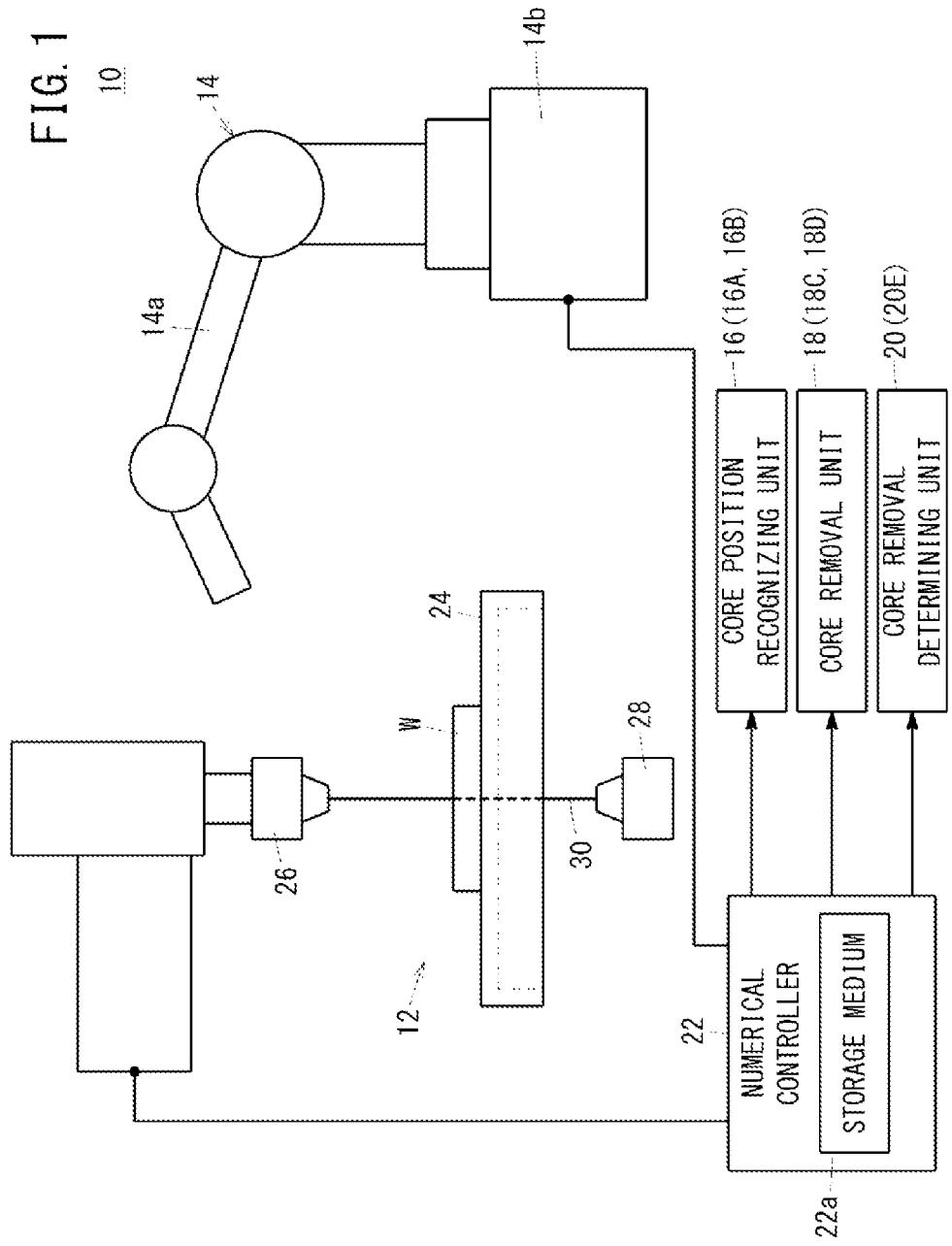

FIG. 2

```
MAIN PROGRAM
02000;
S1D1;     ···1ST MACHINING CONDITIONS, OFFSET SETTING
M98P200;
M123      ···CORE REMOVAL PROCESS
G00X-45.0;

S2D2;     ···2ND MACHINING CONDITIONS, OFFSET SETTING
M98P200;
G00X-45.0;

S3D3;     ···3RD MACHINING CONDITIONS, OFFSET SETTING
M98P200;
M30;

SUB-PROGRAM 1
0200;
M60;      ···WIRE CONNECTION
M98P220;  ···CALL SUB-PROGRAM 2 (MACHINING OF CORE Pc1)
M50;      ···CUT WIRE
G00X15.0;

M60;      ···WIRE CONNECTION
M98P220;  ···CALL SUB-PROGRAM 2 (MACHINING OF CORE Pc2)
M50;      ···CUT WIRE
G00X15.0;

M60;      ···WIRE CONNECTION
M98P220;  ···CALL SUB-PROGRAM 2 (MACHINING OF CORE Pc3)
M50;      ···CUT WIRE
G00X15.0;

M60;      ···WIRE CONNECTION
M98P220;  ···CALL SUB-PROGRAM 2 (MACHINING OF CORE Pc4)
M50;      ···CUT WIRE
M99;

SUB-PROGRAM 2
0220;
G92X0.0Y0.0;  ···COORDINATE SYSTEM SETTING
G91G01G42Y-4.0;
X-5.0;
Y8.0;
X10.0;         ···CUTTING FEED (ELECTRIC DISCHARGE MACHINING SECTION)
Y-8.0;
X-5.0;
G40Y4.0;
M99;
```

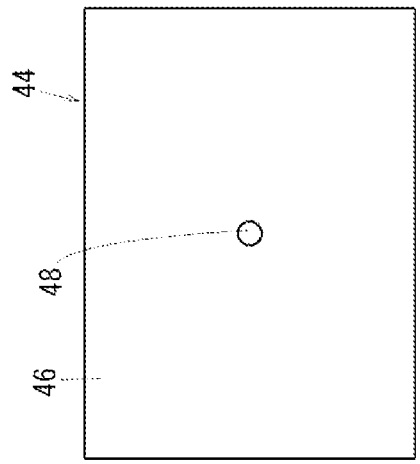
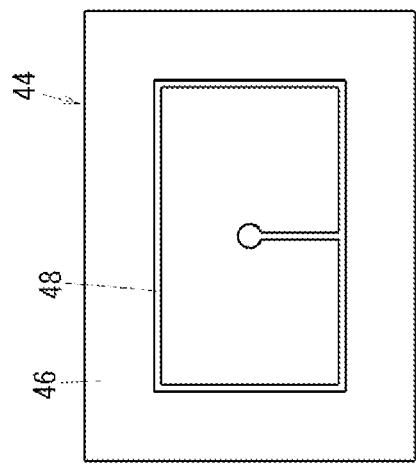

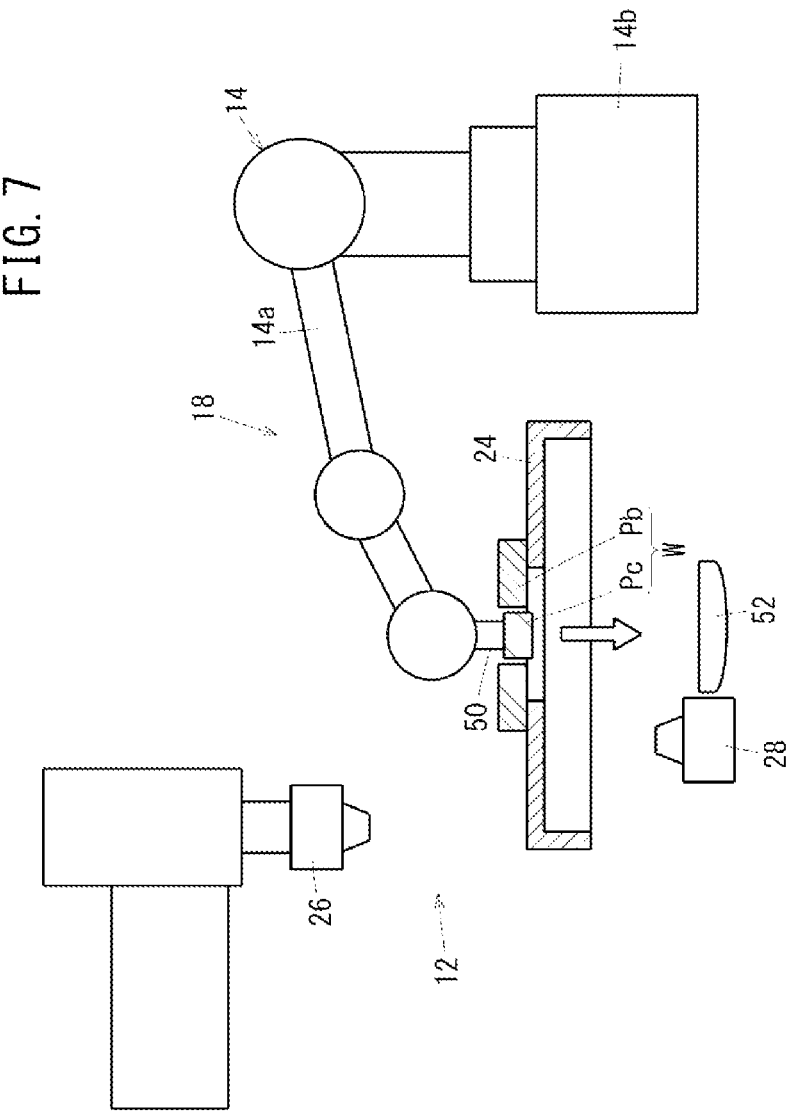

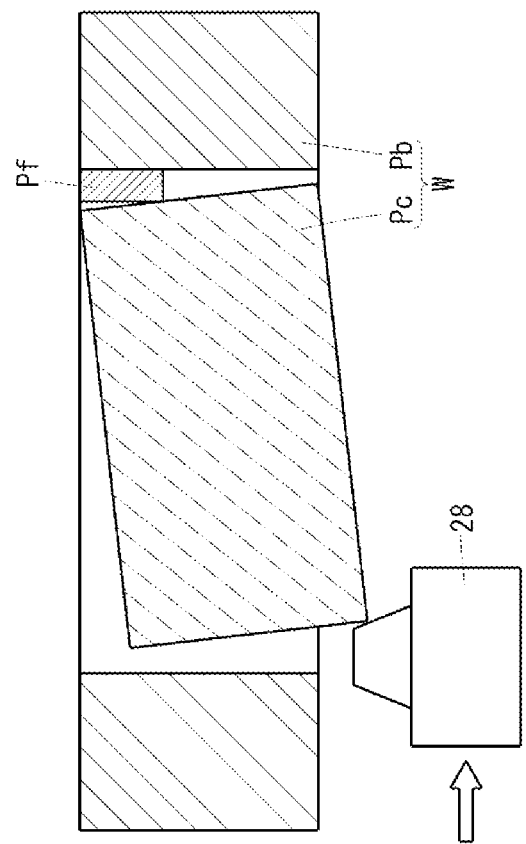

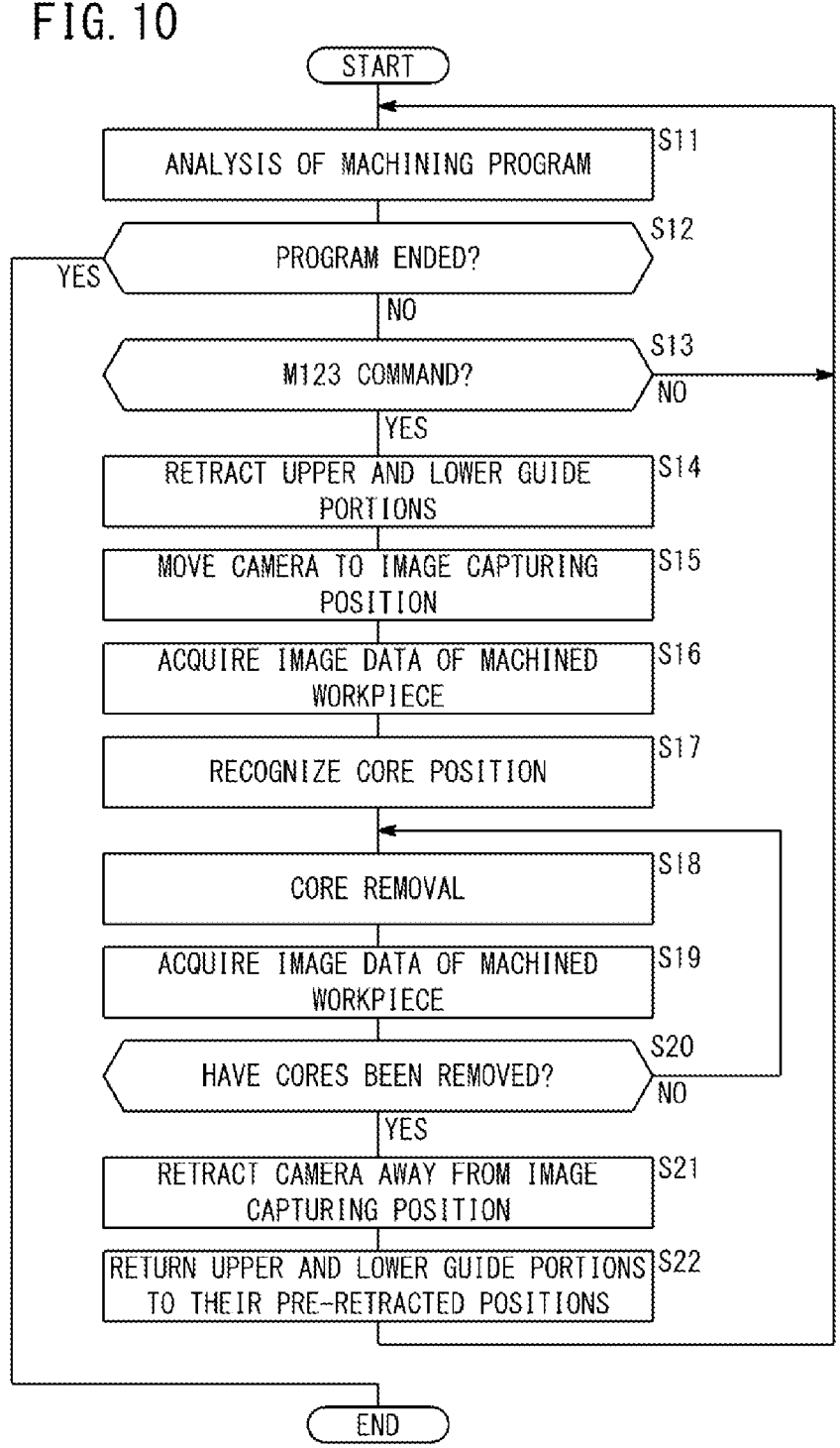

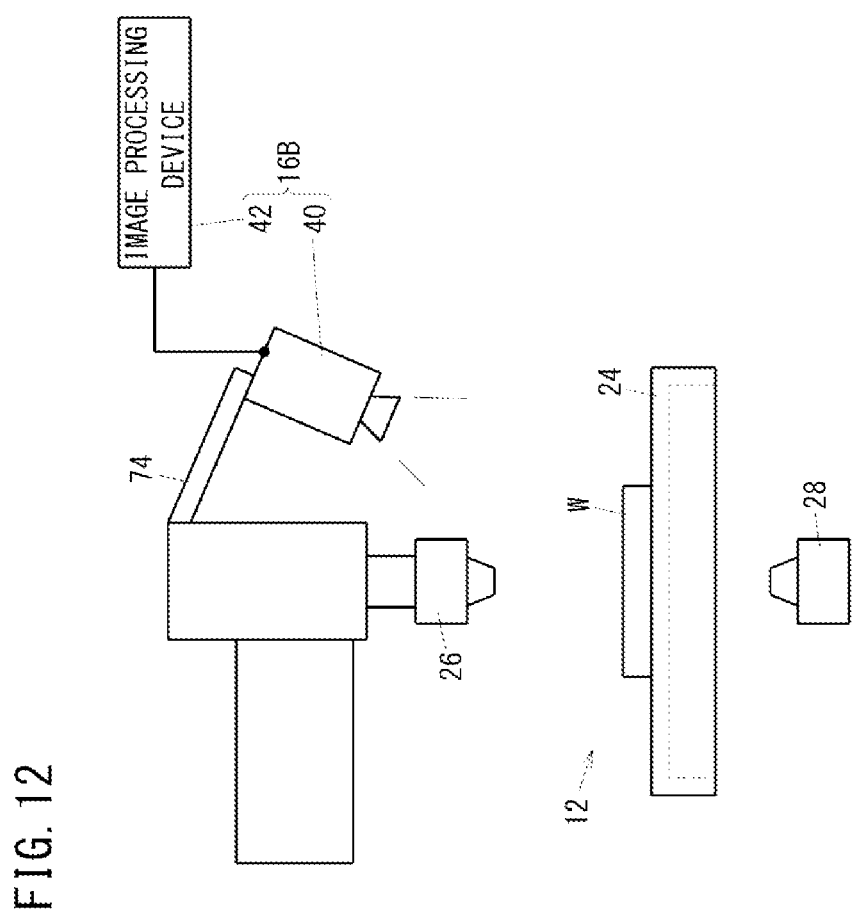

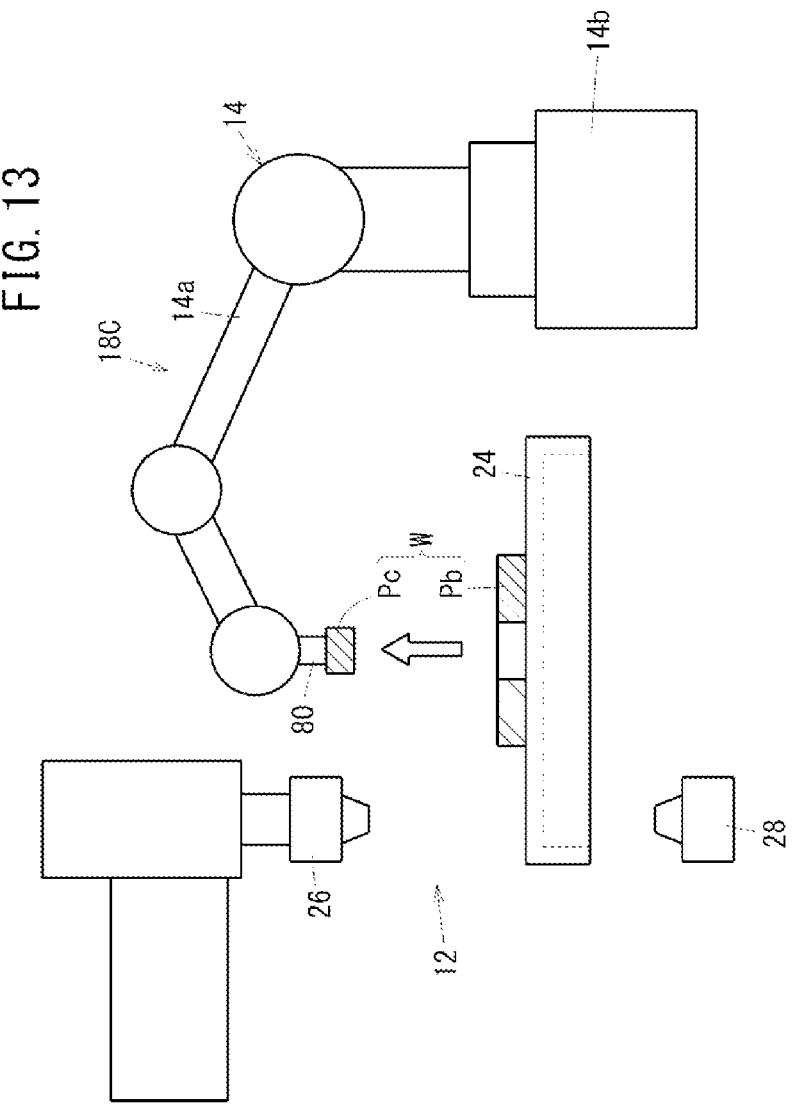

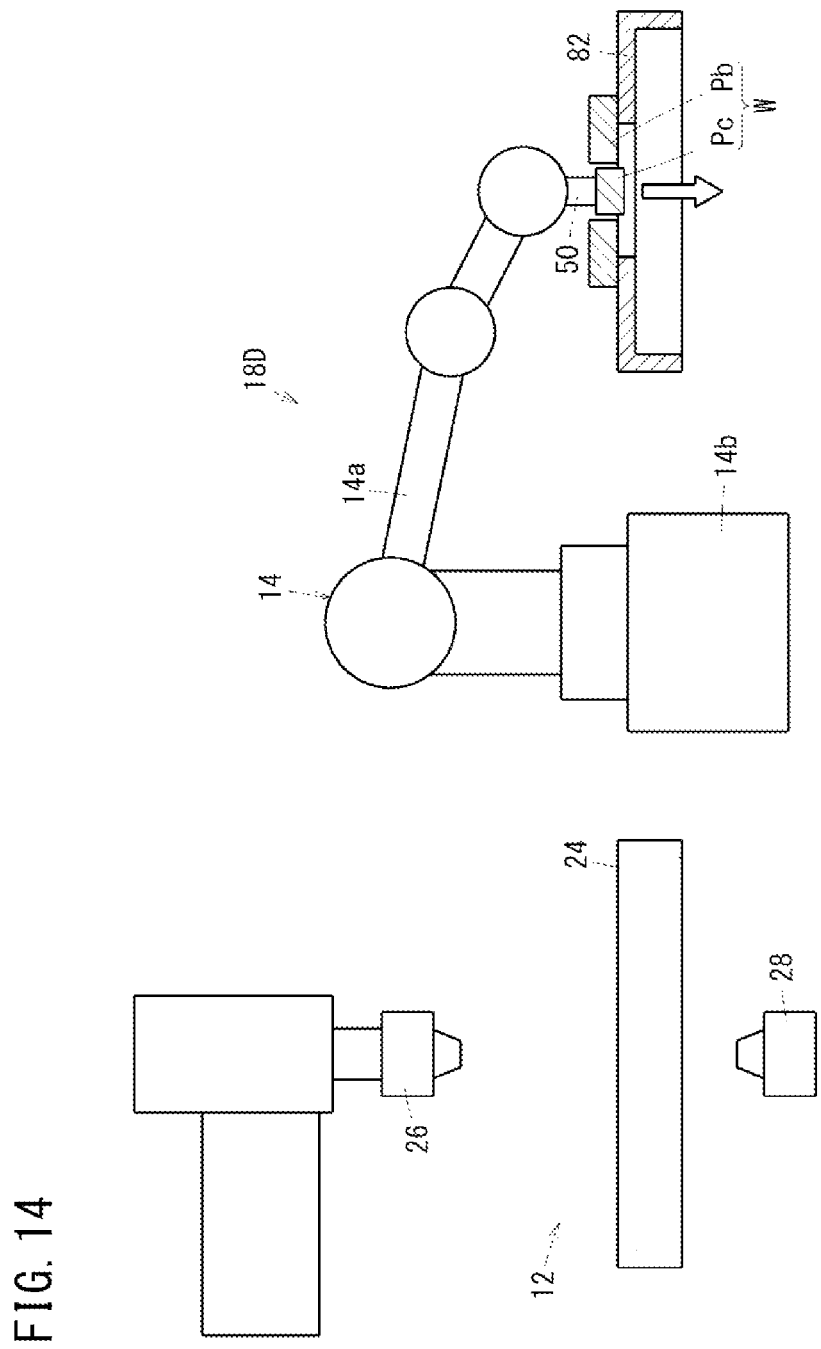

WIRE ELECTRICAL DISCHARGE MACHINE AND WIRE ELECTRICAL DISCHARGE MACHINING METHOD

CROSS-REFERENCE TO RELATED APPLICATION

This application is based upon and claims the benefit of priority from Japanese Patent Application No. 2016-074430 filed on Apr. 1, 2016, the contents of which are incorporated herein by reference.

BACKGROUND OF THE INVENTION

Field of the Invention

The present invention relates to a wire electrical discharge machine and a wire electrical discharge machining method having a core fixing function for fixing a core, which is formed by electrical discharge machining, to a workpiece.

Description of the Related Art

Conventionally, various types of wire electrical discharge machines have been developed, which perform electrical discharge machining on a workpiece by way of electrical discharge generated between the workpiece and a wire electrode. For example, a so-called core fixing function is known, in which, by utilizing a phenomenon in which components of a wire electrode become adhered to the machined workpiece at the time of electrical discharge, a core formed is fixed to a base material of the workpiece (see, Japanese Laid-Open Patent Publication No. 2012-166332, and Japanese Laid-Open Patent Publication No. 2014-014907).

SUMMARY OF THE INVENTION

Speaking generally, such a core fixing function is extremely effective when machining in which a large number of cores are formed in relation to one or a plurality of machined workpieces. This is because, with respect to such a large number of cores, [1] rough machining of a workpiece, [2] removal of the cores, and [3] finishing of the workpiece can be performed collectively, and thus, an improvement in efficiency of such operations as a whole can be expected.

However, human hands are required to remove the cores, and once the rough machining is completed, operation of the wire electrical discharge machine is temporarily stopped, and after a person has removed the cores, the wire electrical discharge machine must be restarted once again in order to perform finishing. When done in this manner, in the case of performing the above-described series of operations, it is not possible to carry out unattended continuous operations from rough machining to finishing, and there is a problem in that efficiency of the operations as a whole cannot be significantly improved.

The present invention has been designed taking into consideration the aforementioned problems, and has the object of providing a wire electrical discharge machine and a wire electrical discharge machining method, in which it is possible to carry out continuous operations from rough machining to finishing of a workpiece.

A first invention is characterized by a wire electrical discharge machine, in which a wire electrode and a workpiece are moved relative to each other according to a machining program, and electrical discharge machining is carried out on the workpiece by an electrical discharge generated between the wire electrode and the workpiece, the wire electrical discharge machine having a core fixing function for fixing a core, which is formed by the electrical discharge machining, to a base material of the workpiece by attachment and deposition of machining chips generated as a result of the electrical discharge machining, the wire electrical discharge machine further including a core position recognizing unit configured to recognize a position of the core which is fixed by the core fixing function, a core removal unit configured to remove the core, which is in the position recognized by the core position recognizing unit, from the workpiece, and a core removal determining unit configured to determine whether or not the core, which is in the position recognized by the core position recognizing unit, has actually been removed by the core removal unit.

In this manner, because the core position recognizing unit which recognizes the position of the core which is fixed by the core fixing function, and the core removal unit which removes the core, which is in the recognized position, from the machined workpiece are provided, it is possible to reliably remove the core by an automatic control. Additionally, since the core removal determining unit is provided that determines whether or not the core, which is in the recognized position, has actually been removed, it is possible to transition to finishing, which is the next step, while ensuring a state in which the core has been removed. Consequently, it is possible to carry out continuous operations from rough machining to finishing of the workpiece.

The core position recognizing unit preferably includes an image capturing unit configured to acquire a captured image showing the workpiece, and recognizes the position of the core from the captured image acquired by the image capturing unit. Owing to this feature, the position of the core can be recognized.

The core position recognizing unit preferably detects from within the captured image acquired by the image capturing unit a machining groove having a fixed width or a width within an allowable range with respect to the fixed width, and recognizes a location surrounded by the machining groove as the position of the core. By focusing attention on the external features of such a machined workpiece, the accuracy in recognizing the core can be increased.

The core position recognizing unit preferably recognizes the position of the core from at least contents of the machining program. Owing to this feature, the position of the core can be recognized without the need to provide a sensor or the like for recognizing the position of the core.

The core position recognizing unit preferably includes a position input unit configured to allow input of position information of the core, and recognizes the position of the core from the position information input by the position input unit. Owing to this feature, the position of the core can be recognized without the need to provide a sensor or the like for recognizing the position of the core.

The core removal unit preferably is a robot.

The core removal unit preferably presses a portion of the workpiece from one direction so as to remove the core.

The core removal determining unit preferably includes an image capturing unit configured to acquire a captured image showing the workpiece, and determines whether or not the core has been removed, from the captured image acquired by the image capturing unit. Owing to this feature, it is possible to determine whether or not the core has been removed.

The core removal determining unit preferably determines whether or not the core has been removed from a comparison between a color of an image region corresponding to the position of the core, and a color of an image region showing the base material, from within the captured image acquired by the image capturing unit. By focusing attention on color characteristics in such a captured image, the accuracy in determining whether removal of the core has succeeded or failed can be increased.

The core removal determining unit preferably includes a contact detecting unit configured to detect contact with the workpiece, and determines whether or not the core has been removed from a detection state of the contact detection unit at the position recognized by the core position recognizing unit. Owing to this feature, it is possible to determine whether or not the core has been removed.

The image capturing unit preferably is mounted on a robot, and is configured to be movable integrally with the robot. The position of the core can be searched for while scanning the imaging range of the imaging capturing unit, and thus the time required for the recognizing step or the determining step can be significantly shortened.

A second invention is characterized by a wire electrical discharge machining method, in which a wire electrode and a workpiece are moved relative to each other according to a machining program, and electrical discharge machining is carried out on the workpiece by an electrical discharge generated between the wire electrode and the workpiece, the wire electrical discharge machining method being implemented by a wire electrical discharge machine having a core fixing function for fixing a core, which is formed by the electrical discharge machining, to the workpiece by attachment and deposition of machining chips generated as a result of the electrical discharge machining, the method including a recognizing step of recognizing a position of the core which is fixed by the core fixing function, a removing step of removing the core, which is in the position recognized by the recognizing step, from the workpiece, and a determining step of determining whether or not the core, which is in the position recognized by the recognizing step, has actually been removed in the removing step.

In this manner, because the position of the core, which is fixed by the core fixing function, is recognized, and the core, which is in the recognized position, is removed from the machined workpiece, it is possible to reliably remove the core by an automatic control. Additionally, since it is determined whether or not the core, which is in the recognized position, has actually been removed, it is possible to transition to finishing, which is the next step, while ensuring a state in which the core has been removed. Consequently, it is possible to carry out continuous operations from rough machining to finishing of a workpiece.

In accordance with the wire electrical discharge machine and the wire electrical discharge machining method, it is possible to carry out continuous operations from rough machining to finishing of a workpiece.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 1 is a schematic diagram showing the overall configuration of a wire electrical discharge machine according to an embodiment of the present invention;

FIG. 2 is a diagram showing the source code of a machining program for obtaining a finished product resulting from a workpiece;

FIGS. 6A and 6B are schematic depictions of captured images showing portions of the machined workpiece of FIG. 4;

FIG. 7 is a configuration diagram of a core removal unit shown in FIG. 1;

FIG. 8 is a view showing a state in which a core is not removed from a machined workpiece;

FIG. 10 is a detailed flowchart in regard to operations of the wire electrical discharge machine according to the embodiment;

FIG. 12 is a configuration diagram showing a second modified example of the core position recognizing unit;

FIG. 13 is a configuration diagram showing a first modified example of the core removal unit;

FIG. 14 is a configuration diagram showing a second modified example of the core removal unit.

DESCRIPTION OF THE PREFERRED EMBODIMENTS

Figure 3:
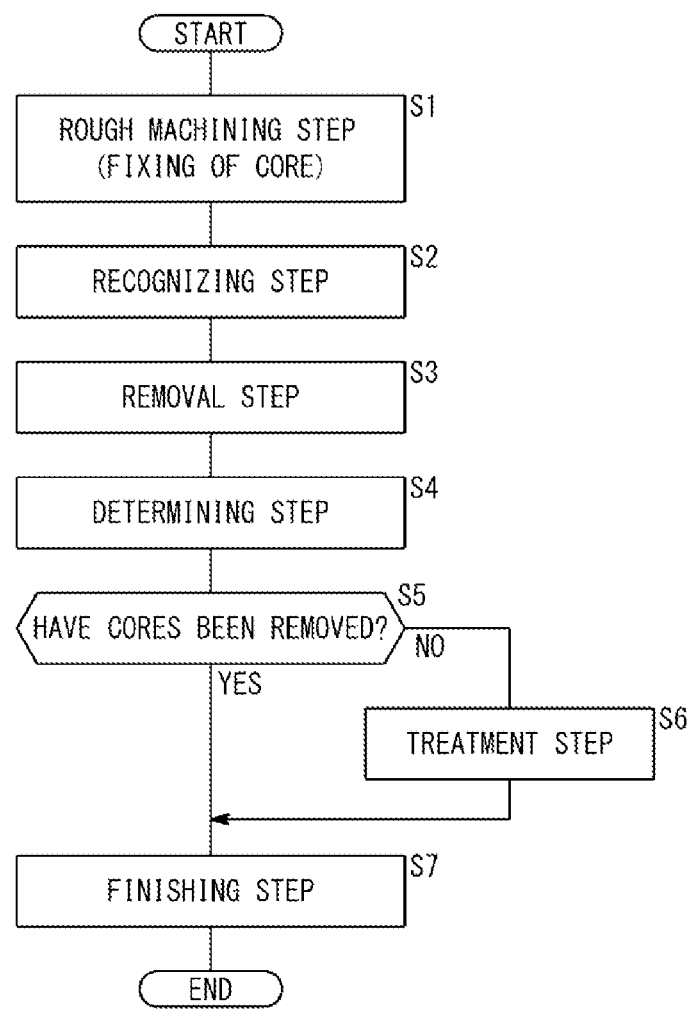
FIG. 3 is a flowchart of process steps for carrying out a wire electrical discharge machining method according to the embodiment.

A preferred embodiment of a wire electrical discharge machine according to the present invention will be described below with reference to the accompanying drawings, in relation to a wire electrical discharge machining method carried out by the wire electrical discharge machine.

[Overall Configuration of Wire Electrical Discharge Machine 10]

FIG. 1 is a schematic diagram showing the configuration of a wire electrical discharge machine 10 according to an embodiment of the present invention. The wire electrical discharge machine 10 is basically equipped with a machine main body 12, a robot 14, a core position recognizing unit 16, a core removal unit 18, a core removal determining unit 20, and a numerical controller 22.

The machine main body 12 is a machine tool that implements electrical discharge machining with respect to a workpiece W by an electrical discharge which is generated between a wire electrode 30 and the workpiece W. The machine main body 12 may adopt a well-known device configuration, which is configured, for example, to include a table 24 on which the workpiece W is movably mounted, and an upper side guide portion 26 and a lower side guide portion 28, which are arranged respectively at positions opposed to each other with the table 24 being sandwiched therebetween.

Between the upper side guide portion 26 and the lower side guide portion 28, a string-shaped wire electrode 30 extends in a normal direction of the table 24 and is connected to the guide portions. The wire electrode 30 is supplied from the upper side guide portion 26 to the lower side guide portion 28 by a non-illustrated wire feeding mechanism. The material of the wire electrode 30, for example, is a metal material such as tungsten-based material, a copper-alloy-based material, or brass-based material, etc. On the other hand, the material of the workpiece W, for example, is an iron-based material or a superhard material (tungsten carbide or the like). Because it is acceptable for the wire electrode 30 and the workpiece W to be moved relatively to each other, for example, the table 24 on which the workpiece W is mounted may be fixed, and the upper side guide portion 26 and the lower side guide portion 28, which support the string-shaped wire electrode 30, may be moved.

The robot 14 is a vertically oriented articulated industrial robot equipped with an arm 14a having a plurality of joints, and a base 14b. Moreover, on a distal end part of the arm 14a of the robot 14, for example, a component such as a camera 40 (see FIG. 5) or a pressing member 50 (see FIG. 7) or the like can be detachably mounted. At least one of the core position recognizing unit 16, the core removal unit 18, and the core removal determining unit 20 may include the robot 14 as one of the constituent elements.

The core position recognizing unit 16 recognizes the position of a core Pc which is fixed by a core fixing function. The core removal unit 18 removes the fixed core Pc from the machined workpiece W. The core removal determining unit 20 determines whether or not the core Pc has actually been removed. The machine main body 12 includes a core fixing function for fixing the core Pc that is formed, to a base material Pb of the workpiece W by utilizing a phenomenon in which components of the wire electrode 30 become adhered to the machined workpiece W at the time of electrical discharge.

The numerical controller 22 is a higher-level host device that comprehensively controls respective components of the wire electrical discharge machine 10 such as the machine main body 12 and the robot 14. The numerical controller 22 is a computer including a storage medium 22a, and which, in accordance with a machining program stored in the storage medium 22a, controls the respective components of the wire electrical discharge machine 10.

[Operations of Wire Electrical Discharge Machine 10]

The wire electrical discharge machine 10 according to the present embodiment is constructed in the manner described above. Next, operations of the wire electrical discharge machine 10 will be described with reference primarily to the source code of FIG. 2 and the flowchart of FIG. 3.

FIG. 2 is a diagram showing the source code of a machining program for obtaining a finished product resulting from the workpiece W. The source code is constituted by three programs including a "main program", a "sub-program 1" and a "sub-program 2".

The main program is a program for issuing commands for [1] implementation of (first time) machining condition settings for the machine main body 12, [2] execution of sub-program 1 (rough machining step), [3] execution of a removal step, [4] implementation of (second time) machining condition settings for the machine main body 12, [5] execution of sub-program 1 (finishing step A), [6] implementation of (third time) machining condition settings for the machine main body 12, and [7] execution of sub-program 1 (finishing step B).

The sub-program 1 is a program for issuing commands for [1] electrical discharge machining at a position of the core Pc1, [2] electrical discharge machining at a position of the core Pc2, [3] electrical discharge machining at a position of the core Pc3, and [4] electrical discharge machining at a position of the core Pc4. Further, immediately before each of the electrical discharge machining steps, connection of the wire electrode 30 is carried out, and immediately after each of the electrical discharge machining steps, the wire electrode 30 is cut.

The sub-program 2 is a program for designating a section to be subjected to electrical discharge machining, and issuing a command for carrying out a cutting feed in the section. Moreover, it should be kept in mind that the core fixing function is utilized according to predetermined rules only during the execution of the rough machining step.

<1. Rough Machining Step>

At first, in a rough machining step (step S1 of FIG. 3), the numerical controller 22, in accordance with the machining program, moves the wire electrode 30 of the machine main body 12 and the workpiece W relatively to each other, and by generating an arc discharge repeatedly between the wire electrode 30 and the workpiece W, rough machining is carried out on the workpiece W. In this instance, by utilizing the core fixing function of the machine main body 12, a core Pc that is formed by adhesion and deposition of machining chips generated due to the electrical discharge is fixed to the base material Pb of the workpiece W.

Figure 4:
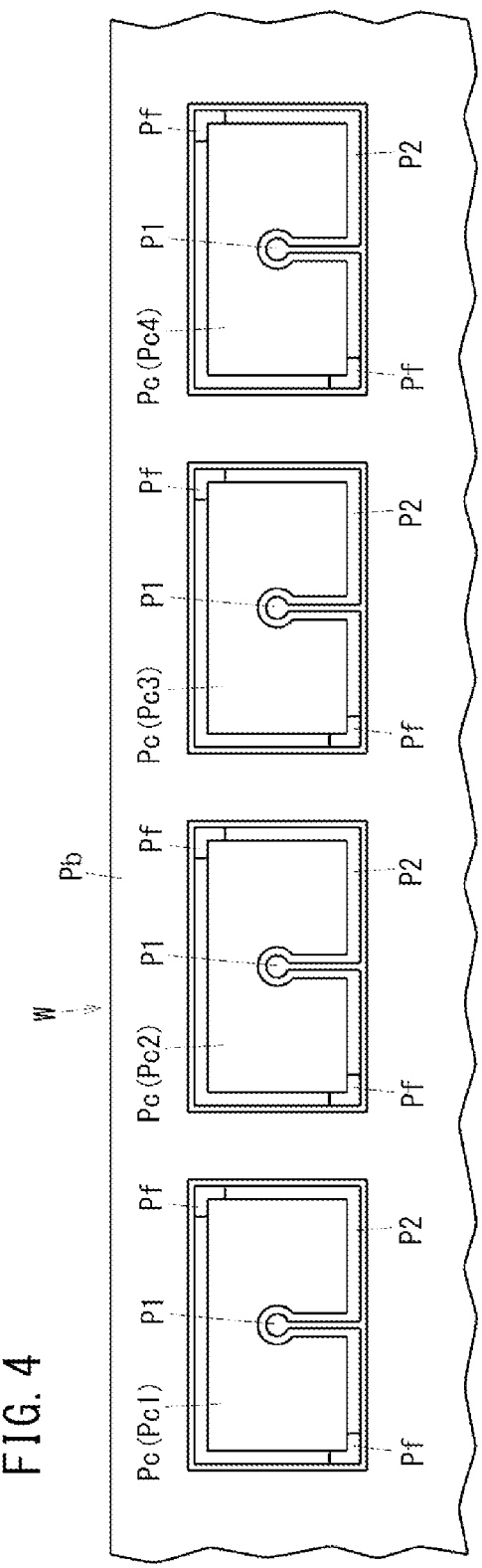
FIG. 4 is a partially enlarged plan view of a workpiece after having carried out a rough machining step (step S1 of FIG. 3) thereon.

FIG. 4 is a partially enlarged plan view of a workpiece W after having carried out the rough machining step (step S1 of FIG. 3) thereon. In the present drawings, a plurality of (in this case, four) cores Pc having the same shape are formed alongside each other in one direction. Each of the cores Pc is of a U-shape with a machining start hole P1 at a center of gravity location thereof. Around the periphery of the core Pc, there is formed a machining groove P2 with a shape obtained by combining one rectangle and one line segment, and having a substantially constant width. At two corners of the rectangle formed by the machining groove P2, fixing locations Pf made up from adhered matter are formed. Consequently, each of the four cores Pc is fixed to the base material Pb of the workpiece W.

In accordance with the rough machining step, cores Pc (Pc1 to Pc4) as shown in FIG. 4 are formed in order of Pc1 to Pc4 in the machined workpiece W. The machine main body 12, after completion of the first electrical discharge (rough machining step), cuts the wire electrode 30 responsive to an "M50" command (see FIG. 2) from the numerical controller 22. In addition, the machine main body 12 causes the table 24 to move responsive to an "M123" command (see FIG. 2) from the numerical controller 22, and after separating and retracting the upper side guide portion 26 and the lower side guide portion 28, the process proceeds to the next step (step S2).

<2. Recognizing Step>

Next, in the recognizing step (step S2 of FIG. 3), the core position recognizing unit 16 recognizes the positions of the cores Pc that were fixed in step S1. In this instance, there will be described in detail a method of recognizing the position of a core Pc from a captured image 44 in which the machined workpiece W is shown.

Figure 5:
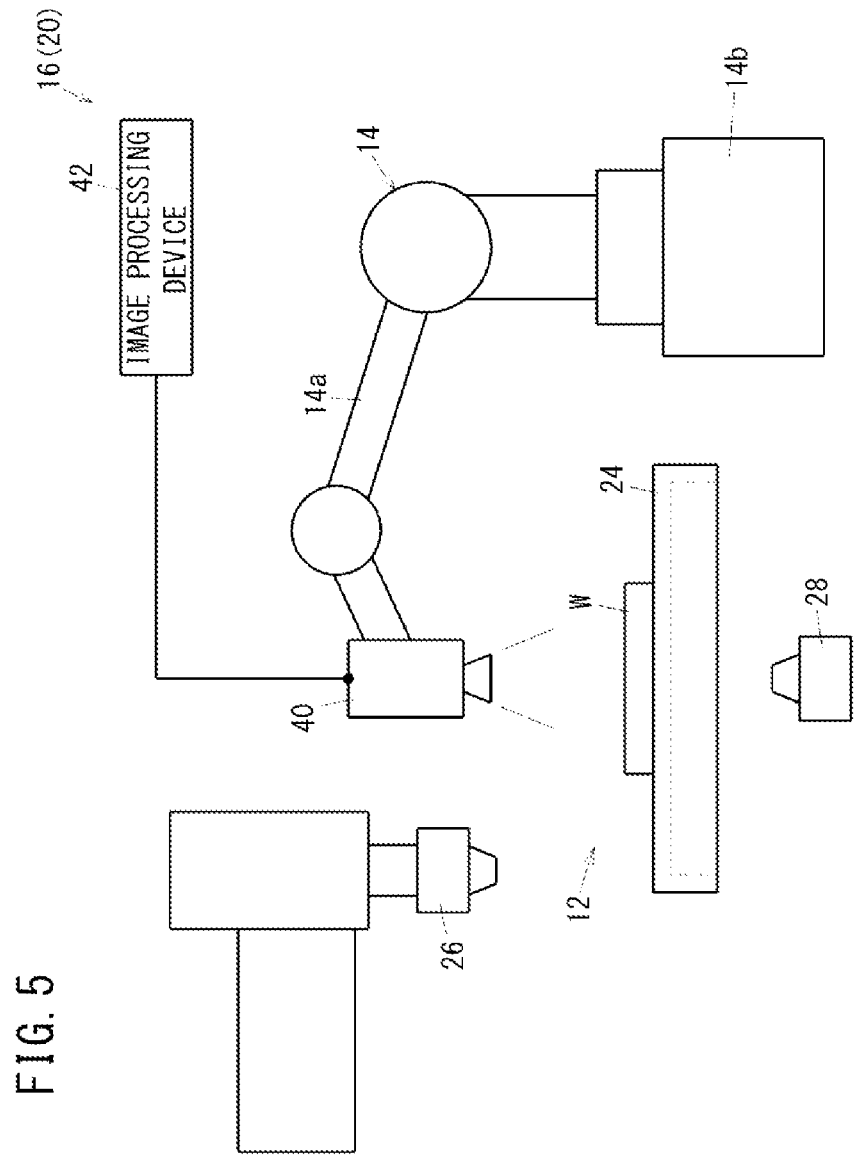
FIG. 5 is a configuration diagram of a core position recognizing unit shown in FIG. 1.

FIG. 5 is a configuration diagram of the core position recognizing unit 16 shown in FIG. 1. The core position recognizing unit 16 is constituted from the robot 14 which is arranged in proximity to the machine main body 12, a camera 40 (image capturing unit) attached to a distal end part of the arm 14a of the robot 14, and an image processing device 42 capable of carrying out desired image processing with respect to a captured image 44 (see FIGS. 6A and 6B) formed by image data acquired from the camera 40. The camera 40 and the image processing device 42 carry out an image capturing process as well as image processing in accordance with commands from the numerical controller 22.

The camera 40 is mounted on the robot 14, and is configured to be movable integrally with the robot 14. The numerical controller 22, by controlling the robot 14, searches for the position of the core Pc while scanning over an imaging range of the camera 40. As a result, the time required for the recognizing step can be shortened significantly.

FIGS. 6A and 6B are schematic depictions of the captured images 44 showing portions of the machined workpiece W of FIG. 4. The captured images 44 may be color images having two or more color channels (for example, RGB), or may be monochrome images having one color channel.

Incidentally, in a state in which the core Pc is fixed to the base material Pb, the machined workpiece W has an outer shape in which, as viewed in plan, the core Pc is surrounded by the machining groove P2. Thus, the core position recognizing unit 16 (more specifically, the image processing device 42) detects, from within the captured image 44 acquired by the camera 40, the machining groove P2 having a fixed width or a width within an allowable range with respect to the fixed width, and recognizes a location surrounded by the machining groove P2 as the position of the core Pc. By focusing attention on the external features of the aforementioned machined workpiece W, the accuracy in recognizing the core Pc is enhanced.

Within the captured image 44 shown in FIG. 6A, there are included a bright region 46 indicative of an image region having a relatively high luminance, and a dark region 48 indicative of an image region having a relatively low luminance. In this instance, the bright region 46 corresponds to an aggregation of the base material Pb and the core Pc. On the other hand, the dark region 48 corresponds to an aggregation of the machining start hole P1, the machining groove P2, and the fixing locations Pf. In the case that such a captured image 44 is obtained, the image processing device 42 recognizes the presence and the position of the core Pc.

Within the captured image 44 shown in FIG. 6B, there are also included a bright region 46 indicative of an image region having a relatively high luminance, and a dark region 48 indicative of an image region having a relatively low luminance. In this instance, the bright region 46 corresponds to the base material Pb, and the dark region 48 corresponds to the machining start hole P1. In the case that such a captured image 44 is obtained, the image processing device 42 does not recognize the presence of the core Pc.

As a method for recognizing the presence or absence and the position of the core Pc, various well known image recognition processes may be adopted. For example, an isolated portion of the bright region 46 may be emphasized using a binarization process and a labeling process, or if the shape of the core Pc is known, a template matching process may be used.

In this manner, in the example shown in FIG. 4, the core position recognizing unit 16 (and more specifically, the image processing device 42) recognizes the positions of four cores Pc. The core position recognizing unit 16 (and more specifically, the image processing device 42) outputs to the numerical controller 22 position information of the four cores Pc that were recognized, whereupon the process proceeds to the next step (step S3).

<3. Removal Step>

Next, in the removal step (step S3 of FIG. 3), the core removal unit 18 attempts to remove the cores Pc, which are at the positions recognized in step S2, from the machined workpiece W. In this instance, there will be described in detail a method of removing the cores Pc using the robot 14.

FIG. 7 is a configuration diagram of the core removal unit 18 shown in FIG. 1. The core removal unit 18 is constituted from the robot 14, which is arranged in proximity to the machine main body 12, and a pressing member 50, which is mounted on a distal end part of the arm 14a of the robot 14. Further, on a side surface of the lower side guide portion 28, a collection basket 52 is provided for collecting the removed cores Pc.

In response to a command from the numerical controller 22, the robot 14 moves the pressing member 50 to the position of the core Pc, and thereafter presses the core Pc from an upper side thereof. Upon doing so, the core Pc is separated away from the machined workpiece W, and after having dropped in a vertical direction under its own weight, the core Pc is collected in the collection basket 52.

In this manner, in the example of FIG. 4, the core removal unit 18 removes the four cores Pc from the machined workpiece W. Following completion of all of the removal steps, the numerical controller 22 proceeds to the next step (step S4).

<4. Determining Step>

Next, in the determining step (step S4 of FIG. 3), the core removal determining unit 20 determines whether or not the cores Pc, which were at the positions recognized in step S2, have been removed from the machined workpiece W. The reasons for carrying out such a determining step will be described below.

As shown in FIG. 8, if execution of the machining program continues while in a state in which the core Pc is not removed from the machined workpiece W, then interference may occur between the core Pc which is retained by the fixing location Pf, and a movable part (for example, the lower side guide portion 28) of the machine main body 12. If the movable part becomes damaged due to such interference, since it is necessary to temporarily stop the line and then repair the machine main body 12, a prolonged machine down time occurs. Thus, as a countermeasure against the occurrence of a machined workpiece W from which the core Pc is not removed, it should be borne in mind that, according to the present embodiment, an automatic determination is performed without the need for human intervention.

In this instance, there will be described in detail a method of determining success or failure of the removal step from a captured image 60 (see FIGS. 9A through 9C) showing the machined workpiece W. The core removal determining unit 20 can use in common the structure of the core position recognizing unit 16 shown in FIG. 5. In this case, the core removal determining unit 20 is constituted from the robot 14 arranged in proximity to the machine main body 12, the camera 40 (image capturing unit) attached to the distal end part of the arm 14a of the robot 14, and the image processing device 42 which is capable of carrying out desired image processing with respect to a captured image 60 formed by image data acquired from the camera 40.

The camera 40 is mounted on the robot 14, and is configured to be movable integrally with the robot 14. Similar to the case of the core position recognizing unit 16, the position of the core Pc can be searched for while scanning the imaging range of the camera 40, and thus the time required for the determining step can be significantly shortened.

Figure 9C:
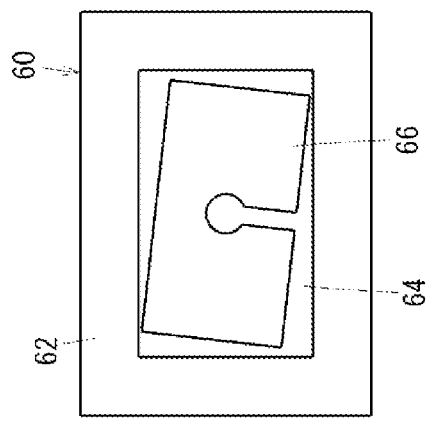
FIGS. 9A through 9C are schematic depictions of captured images showing portions of a machined workpiece after having carried out a removal step (step S3 of FIG. 3) thereon.
Figure 9B:
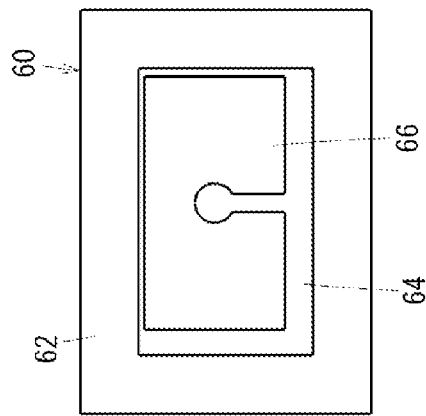
Figure 9A:
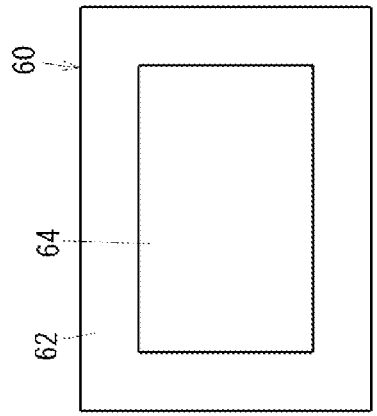

FIGS. 9A through 9C are schematic depictions of captured images 60 showing portions of a workpiece W after having carried out the removal step (step S3 of FIG. 3)

thereon. The captured images 60 may be color images having two or more color channels (for example, RGB), or may be monochrome images having one color channel.

Incidentally, when the core Pc is removed from the machined workpiece W, it may be considered that a bottom portion of a non-illustrated processing bath will be reflected in the image, whereas in the case that the core Pc is not removed, it may be considered that the core Pc will be reflected in the image. Thus, the core removal determining unit 20 (image processing device 42) determines whether or not the core Pc has been removed, from a comparison between a color of an image region corresponding to the position of the core Pc, and a color of an image region showing the base material Pb, from within the captured image 60 acquired by the camera 40. By focusing attention on color characteristics in the above-described captured images 60, the accuracy in determining whether removal of the core Pc has succeeded or failed can be increased.

Within the captured image 60 shown in FIG. 9A, there are included a bright region 62 indicative of an image region having a relatively high brightness, and a dark region 64 indicative of an image region having a relatively low brightness. In this instance, the bright region 62 corresponds to the base material Pb, and the dark region 64 corresponds to a bottom portion of the processing bath. It may be assumed that the difference in brightness between the dark region 64 corresponding to the position of the core Pc and the bright region 62 indicative of the base material Pb is larger than a threshold value. In the case that such a captured image 60 is obtained, the image processing device 42 determines that the core Pc has actually been removed.

Within the captured images 60 shown in FIGS. 9B and 9C, there are included the bright region 62 indicative of an image region having a relatively high brightness, a dark region 64 indicative of an image region having a relatively low brightness, and an intermediate region 66 indicative of an image region having an intermediate brightness. In this instance, the bright region 62 corresponds to the base material Pb, the dark region 64 corresponds to a bottom portion of the processing bath, and the intermediate region 66 corresponds to the core Pc. It may be assumed that the difference in brightness between the intermediate region 66 corresponding to the position of the core Pc, and the bright region 62 indicative of the base material Pb is smaller than the threshold value. In the case that such a captured image 60 is obtained, the image processing device 42 determines that the core Pc was not actually removed.

As used in the present specification, the term "color" is a broad concept, including not only luminance but also brightness, saturation, and hue. Further, in the above example, although the color of the image region indicative of the base material Pb has been referred to, the determination as to whether or not removal of the core Pc was successful may be made from a distribution or statistics of colors in the vicinity of the position of the core Pc. More specifically, in the case that the standard deviation of the color values within the image region (the rectangular region in this case) corresponding to the core Pc is equal to or less than a threshold value, it may be determined that the core Pc "was removed", and in the case that the standard deviation exceeds the threshold value, it may be determined that the core Pc "was not removed".

In this manner, in the example of FIG. 4, the core removal determining unit 20 determines whether or not the four cores Pc have actually been removed. The numerical controller 22 performs different operations according to the determination result of the image processing device 42. If a determination result is obtained to the effect that all of the cores Pc have been removed (step S5: YES), the process proceeds to step S7.

On the other hand, if a determination result is obtained to the effect that at least one of the cores Pc was not removed (step S5: NO), then the numerical controller 22 performs the operation concerning the treatment step (step S6 of FIG. 3) by which measures are taken with respect to the machined workpiece W. For example, the numerical controller 22 may perform the removal step by the core removal unit 18 again. Alternatively, the numerical controller 22 may inform the operator by an alarm display that the core Pc has not been removed, and may suspend execution of the machining program as necessary.

After removal of all of the cores Pc has been completed, but before proceeding to step S7, the machine main body 12 returns the table 24, the upper side guide portion 26, and the lower side guide portion 28 to their original positions. Then, in accordance with subsequent commands (commands "GOO", "M60" in FIG. 2) from the numerical controller 22, the machine main body 12 moves the table 24, and after having connected the wire electrode 30, the process proceeds to the next step (step S7).

<5. Finishing Step>

Lastly, in a finishing step (step S7 of FIG. 3), the machine main body 12 moves the wire electrode 30 and the workpiece W relatively to each other according to the machining program, and by generating an arc discharge repeatedly between the wire electrode 30 and the workpiece W, finishing is carried out on the workpiece W.

The machine main body 12, every time that the second and third electrical discharge machining processes (finishing step) are completed, cuts the wire electrode 30 responsive to the "M50" command (see FIG. 2) from the numerical controller 22. In addition, the machine main body 12 completes the series of operations from the rough machining step to the finishing step, responsive to an "M30" command (see FIG. 2) from the numerical controller 22.

[Detailed Flowchart]

FIG. 10 is a detailed flowchart in regard to operations of the wire electrical discharge machine 10, and in particular operations that take place during the "M123" command (steps S2 through S6 in FIG. 3) according to the present embodiment.

(S11) Analysis of machining program by the numerical controller 22

(S12) Determination of completion of machining program (S13) Determination of presence or absence of "M123" command However, in the case that execution of the machining program has come to an end, operations of the wire electrical discharge machine 10 are terminated. Further, if there is no "M123" command, the analysis of the machining program continues.

(S14) Retraction of upper side guide portion 26 and lower side guide portion 28

(S15) Move camera 40 to image capturing position (S16) Acquisition of image data showing the machined workpiece W (S17) Recognition of position where the core Pc exists (S18) Removal of the core Pc (S19) Acquisition of image data showing the machined workpiece W (S20) Determination of success or failure in removal of the core Pc However, in the case that at least one of the cores Pc was not removed, the relevant steps are repeated until all of the cores Pc have been removed.

(S21) Retract camera 40 from imaging capturing position (S22) Return the upper side guide portion 26 and the lower side guide portion 28 to their original positions.

Thereafter, analysis of the machining program (step S11) is continued.

[Advantages and Effects of Wire Electrical Discharge Machine 10]

As has been discussed above, the wire electrical discharge machine 10 is [1] a machine in which a wire electrode 30 and a workpiece W are moved relative to each other according to a machining program, and electrical discharge machining is carried out on the workpiece W by an electrical discharge generated between the wire electrode 30 and the workpiece W, and which includes a core fixing function for fixing a core Pc, which is formed by electrical discharge machining, to a base material Pb of the workpiece W by attachment and deposition of machining chips generated as a result of the electrical discharge machining. In addition, the wire electrical discharge machine 10 is equipped with [2] the core position recognizing unit 16 configured to recognize the position of the core Pc which is fixed by the core fixing function, [3] the core removal unit 18 configured to remove the core Pc, which is in the position recognized by the core position recognizing unit 16, from the machined workpiece W, and [4] the core removal determining unit 20 configured to determine whether or not the core Pc, which is in the position recognized by the core position recognizing unit 16, has actually been removed by the core removal unit 18.

Further, the wire electrical discharge machining method implemented by the wire electrical discharge machine 10 includes [1] the recognizing step (step S2) of recognizing the position of the core Pc which is fixed by the core fixing function, [2] the removing step (step S3) of removing the core (Pc), which is in the position recognized by the recognizing step, from the machined workpiece W, and [3] the determining step (step S4) of determining whether or not the core Pc, which is in the position recognized by the recognizing step, has actually been removed in the removing step.

In this manner, because the core position recognizing unit 16 which is configured to recognize the position of a core Pc which is fixed by the core fixing function, and the core removal unit 18 which is configured to remove the core Pc, which is in the recognized position, from the machined workpiece W are provided, it is possible to reliably remove the core Pc by an automatic control. Additionally, since the core removal determining unit 20 is provided that determines whether or not the core Pc, which is in the recognized position, has actually been removed, it is possible to transition to finishing, which is the next step, while ensuring a state in which the core Pc has been removed. Consequently, it is possible to carry out continuous operations from rough machining to finishing of a workpiece W.

In particular, such an effect is exhibited remarkably in the case that a workpiece W is handled having a plurality of cores Pc, and/or in the case of handling a plurality of workpieces W collectively. This is because, with respect to such a plurality of cores Pc, [1] rough machining of the workpiece W, [2] removal of the cores Pc, and [3] finishing of the workpiece W can be performed collectively, and thus, an improvement in efficiency of such operations as a whole can be realized.

Modified Examples of Core Position Recognizing Unit 16

Incidentally, the core position recognizing unit 16 is not limited to the exemplary configuration indicated in the above embodiment (see FIG. 5), and other structures or configurations may be adopted therein. Concerning structural elements that are the same as those of the above-described embodiment, they are denoted by the same reference numerals, and detailed descriptions of such features are omitted.

First Modified Example

Figure 11:
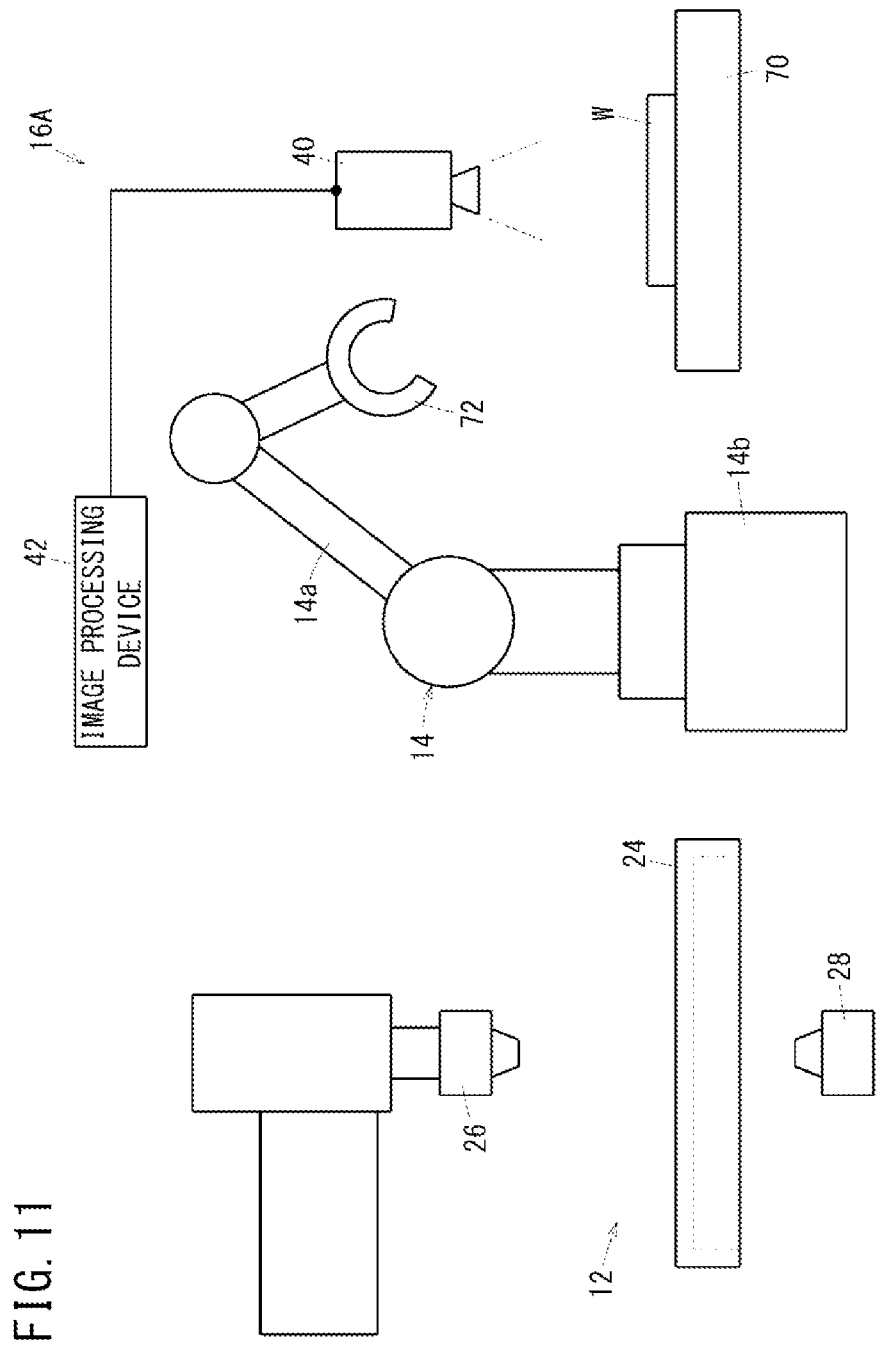
FIG. 11 is a configuration diagram showing a first modified example of the core position recognizing unit.

FIG. 11 is a configuration diagram showing a first modified example of the core position recognizing unit 16. As understood from the present drawing, a core position recognizing unit 16A differs from the above-described embodiment (the core position recognizing unit 16), in that [1] it is equipped with another table 70, [2] a first gripping member 72 is mounted thereon instead of the camera 40, and [3] the camera 40 is arranged in a posture and at a position so as to be oriented toward the table 70.

In the event that the aforementioned configuration is adopted, in accordance with commands from the numerical controller 22, and prior to performing the recognizing step, the robot 14 grips the machined workpiece W on the table 24 with the first gripping member 72, and moves the machined workpiece W onto the table 70. In this manner, the recognizing step may be performed after the machined workpiece W has been moved to a position that differs from the position where the rough machining step was performed. By separating the stations, it becomes easier to improve the efficiency of the operations as a whole.

Second Modified Example

FIG. 12 is a configuration diagram showing a second modified example of the core position recognizing unit 16. As understood from the present drawing, a core position recognizing unit 16B differs from the above-described embodiment (the core position recognizing unit 16), in that [1] a support plate 74 for supporting and fixing the camera 40 is attached to the machine main body 12, and [2] the camera 40 is arranged in a posture and at a position so as to be oriented toward the table 24 (machined workpiece W).

In the case that the aforementioned configuration is adopted, after completion of the rough machining step, the core position recognizing unit 16B captures an image without moving the machined workpiece W, and the position of the core Pc is recognized from the acquired captured image 44. In this manner, by providing the camera 40 on the machine main body 12, the time required to transport the machined workpiece W can be omitted.

Third Modified Example

In the above-described embodiment, the first modified example, and the second modified example, the position of the core Pc is recognized from the outer shape of the roughly machined workpiece W, however, the present invention is not limited to such a method. For example, the core position recognizing unit 16 may recognize the position of the core Pc by analyzing control information from the wire electrical discharge machine 10.

[1] For example, the core position recognizing unit can recognize the position of the core Pc from at least contents of the machining program. In the example of FIG. 2, by analyzing the source code, including the "S1D1" command for setting the machining conditions for the first time (rough machining), the "G92" command for setting a reference point (the origin of a relative coordinate system), and the "G01" command for instructing the cutting feed, the machined shape and the relative position of the core Pc can be specified. In this case, the core position recognizing unit is capable of recognizing the position of the core Pc by additionally acquiring the positions (positions on an absolute coordinate system) where the operation of the core fixing function was performed.

[2] The core position recognizing unit can be configured to include a position input unit which allows input of position information of the core Pc, and the position of the core Pc can be recognized from the position information input by the position input unit. For example, the operator inputs position information of the reference point included in the "G92" command, using a GUI (Graphical User Interface) function of the numerical controller 22 or another terminal device. In this case, the core position recognizing unit is capable of recognizing the position of the core Pc from the previously input position information.

Modified Examples of Core Removal Unit 18

Further, the core removal unit 18 is not limited to the exemplary configuration indicated in the above embodiment (see FIG. 7), and other structures or configurations may be adopted therein. Concerning structural elements that are the same as those of the above-described embodiment, they are denoted by the same reference numerals, and detailed descriptions of such features are omitted.

First Modified Example

FIG. 13 is a configuration diagram showing a first modified example of the core removal unit 18. As can be understood from the present drawing, a core removal unit 18C differs from the above-described embodiment (core removal unit 18) in that [1] a second gripping member 80 is mounted thereon instead of the pressing member 50, and [2] the collection basket 52 is not provided.

In the case that the aforementioned configuration is adopted, after having carried out the recognizing step, the robot 14 moves the second gripping member 80 to the position of the core Pc, and thereafter initiates a sucking operation from an upper side of the core Pc. In addition, the robot 14 takes out and separates the core Pc away from the machined workpiece W, and conveys the core Pc out from the machine main body 12. In this manner, the direction of application of the external force with respect to the core Pc is not limited to being from the upper side toward the lower side (FIG. 7), but may be in a direction opposite thereto (from the lower side toward the upper side).

Second Modified Example

FIG. 14 is a configuration diagram showing a second modified example of the core removal unit 18. As can be understood from the present drawing, such a core removal unit 18D differs from the above-described embodiment (core removal unit 18) in that another table 82 is provided.

In the event that the aforementioned configuration is adopted, in accordance with commands from the numerical controller 22, and prior to performing the removal step, another robot (not shown) grips the machined workpiece W on the table 24, and moves the machined workpiece W onto the table 82. In this manner, the removal step may be performed after the machined workpiece W has been moved to a position that differs from the position where the rough machining step was performed. Similar to the case of FIG. 11, by separating the stations, it becomes easier to improve the efficiency of the operations as a whole.

Third Modified Example

In the above-described embodiment, the first modified example, and the second modified example, a portion of the machined workpiece W is pressed from one direction in a state of being in contact with the machined workpiece W in order to remove the core Pc, however, the present invention is not limited to such a pressing method. For example, the core removal unit may be a fluid ejecting unit, which is capable of ejecting liquid (for example, water) or a gas (for example, air) toward the machined workpiece W.

Modified Example of Core Removal Determining Unit 20

Further, the core removal determining unit 20 is not limited to the exemplary configuration indicated in the above embodiment (see FIG. 5), and other structures or configurations may be adopted therein. Concerning structural elements that are the same as those of the above-described embodiment, they are denoted by the same reference numerals, and detailed descriptions of such features are omitted.

Modified Example

Figure 15A:
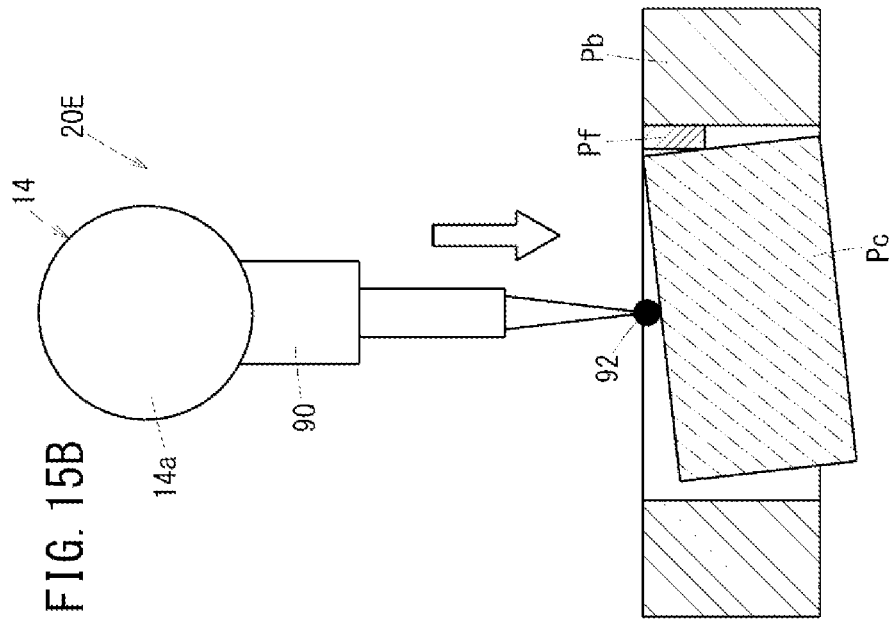
FIGS. 15A and 15B are configuration diagrams showing a modified example of a core removal determining unit.
Figure 15B:
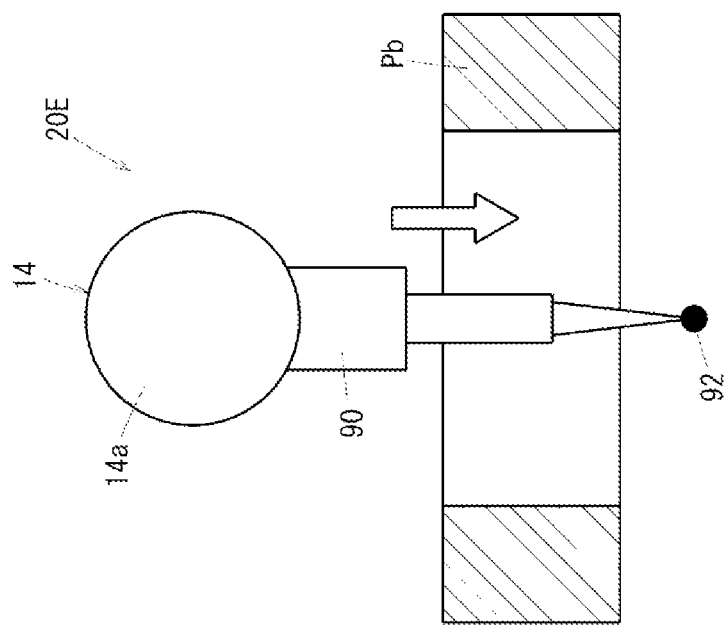

FIGS. 15A and 15B are configuration diagrams showing a modified example of the core removal determining unit 20. As can be understood from the present drawings, a core removal determining unit 20E differs from the above-described embodiment (core removal determining unit 20), in that, instead of the camera 40 shown in FIG. 5, a contact sensor 90 (contact detecting unit) is attached to the distal end part of the arm 14a of the robot 14.

In other words, the core removal determining unit 20E is configured to include a contact sensor 90 that detects contact with the workpiece W, and it is determined whether or not the core Pc has been removed from a detection state of the contact sensor 90 at the position recognized by the core position recognizing unit 16.

As shown in FIG. 15A, responsive to a command from the numerical controller 22, the robot 14 moves the contact sensor 90 downwardly from above with respect to the position of the core Pc. In addition, the core removal determining unit 20E detects whether or not a probe 92 of the contact sensor 90 has come into contact with the workpiece W until arriving at a position lower than the lower surface of the base material Pb. In the example of the present drawing, since the core removal determining unit 20E did not detect contact with the workpiece W, the core removal determining unit 20E determines that the core Pc was actually removed. On the other hand, in the example shown in FIG. 15B, since the probe 92 of the contact sensor 90 detects contact with the workpiece W prior to arriving at a position lower than the lower surface of the of the base material Pb, the core removal determining unit 20E determines that the core Pc has not actually been removed.

In this manner, the sensor that is used in the determining step (step S4 of FIG. 3) is not limited to being a non-contact type of sensor (i.e., the camera 40), and may be the contact sensor 90. Further, the type of sensor is not limited, so long as the state of the core Pc can be determined.

[Remarks]

The present invention is not limited to the above-described embodiment and modifications thereof, and the invention can freely be modified without departing from the scope of the present invention. Alternatively, it goes without saying that each of the above-described configurations may be arbitrarily combined within a range in which no technical inconsistencies result.

What is claimed is:

1. A wire electrical discharge machine comprising:
a wire electrode and a workpiece movable relative to each other according to a machining program to carry out electrical discharge machining on the workpiece by an electrical discharge generated between the wire electrode and the workpiece, the wire electrical discharge machine having a core fixing function for fixing a core, which is formed by the electrical discharge machining, to a base material of the workpiece by attachment and deposition of machining chips generated as a result of the electrical discharge machining;
a core position recognizing unit configured to recognize a position of the core which is fixed by the core fixing function during execution of the machining program;
a core removal unit configured to remove the core, which is in the position recognized by the core position recognizing unit, from the workpiece during execution of the machining program; and
a core removal determining unit configured to determine whether or not the core, which is in the position recognized by the core position recognizing unit, has actually been removed by the core removal unit during execution of the machining program,
wherein the core position recognizing unit includes an image capturing unit configured to acquire a captured image showing the workpiece, and recognizes the position of the core from the captured image acquired by the image capturing unit.

2. The wire electrical discharge machine according to claim 1, wherein the core position recognizing unit detects from within the captured image acquired by the image capturing unit a machining groove having a fixed width or a width within an allowable range with respect to the fixed width, and recognizes a location surrounded by the machining groove as the position of the core.

3. The wire electrical discharge machine according to claim 1, wherein the core removal unit includes a robot.

4. The wire electrical discharge machine according to claim 1, wherein the core removal unit presses a portion of the workpiece from one direction so as to remove the core.

5. The wire electrical discharge machine according to claim 1, wherein the core removal determining unit includes an image capturing unit configured to acquire a captured image showing the workpiece, and determines whether or not the core has been removed from the captured image acquired by the image capturing unit.

6. The wire electrical discharge machine according to claim 1, wherein the core removal determining unit includes a contact detecting unit configured to detect contact with the workpiece, and determines whether or not the core has been removed from a detection state of the contact detecting unit at the position recognized by the core position recognizing unit.

7. The wire electrical discharge machine according to claim 1, wherein the image capturing unit is mounted on a robot, and is configured to be movable integrally with the robot.

8. The wire electrical discharge machine according to claim 5, wherein the core removal determining unit determines whether or not the core has been removed from a comparison between a color of an image region corresponding to the position of the core, and a color of an image region showing the base material, from within the captured image acquired by the image capturing unit.

9. A wire electrical discharge machining method comprising:
providing a wire electrode and a workpiece movable relative to each other according to a machining program to carry out electrical discharge machining on the workpiece by an electrical discharge generated between the wire electrode and the workpiece, a core fixing function for fixing a core, which is formed by the electrical discharge machining, to the workpiece by attachment and deposition of machining chips generated as a result of the electrical discharge machining;
a recognizing step of recognizing a position of the core which is fixed by the core fixing function during execution of the machining program;
a removing step of removing the core, which is in the position recognized by the recognizing step, from the workpiece during execution of the machining program; and
a determining step of determining whether or not the core, which is in the position recognized by the recognizing step, has actually been removed in the removing step during execution of the machining program,
wherein in the recognizing step, the position of the core is recognized from a captured image acquired by an image capturing unit and showing the workpiece.

10. A wire electrical discharge machine comprising:
a wire electrode and a workpiece movable relative to each other according to a machining program, and electrical discharge machining is carried out on the workpiece by an electrical discharge generated between the wire electrode and the workpiece, the wire electrical discharge machine having a core fixing function for fixing a core, which is formed by the electrical discharge machining, to a base material of the workpiece by attachment and deposition of machining chips generated as a result of the electrical discharge machining;
a core position recognizing unit configured to recognize a position of the core which is fixed by the core fixing function during execution of the machining program;
a core removal unit configured to remove the core, which is in the position recognized by the core position recognizing unit, from the workpiece during execution of the machining program; and
a core removal determining unit configured to determine whether or not the core, which is in the position recognized by the core position recognizing unit, has actually been removed by the core removal unit during execution of the machining program,
wherein the core removal determining unit includes an image capturing unit configured to acquire a captured image showing the workpiece, and determines whether or not the core has been removed from the captured image acquired by the image capturing unit.

11. The wire electrical discharge machine according to claim 10, wherein the core removal determining unit determines whether or not the core has been removed from a comparison between a color of an image region corresponding to the position of the core, and a color of an image region showing the base material, from within the captured image acquired by the image capturing unit.

12. A wire electrical discharge machining method comprising:

provinding a wire electrode and a workpiece movable relative to each other according to a machining program to carry out electrical discharge machining the workpiece by an electrical discharge generated between the wire electrode and the workpiece, a core fixing function for fixing a core, which is formed by the electrical discharge machining, to the workpiece by attachment and deposition of machining chips generated as a result of the electrical discharge machining, a recognizing step of recognizing a position of the core which is fixed by the core fixing function during execution of the machining program:

a removing step of removing the core, which is in the position recognized by the recognizing step, from the workpiece during execution of the machining program; and a determining step of determining whether or not the core, which is in the position recognized by the recognizing step, has actually been removed in the removing step during execution of the machining program, wherein the recognizing step is determined whether or not the core has been removed from a captured image showing the workpiece and acquired by the image capturing unit.

* * * * *